United States Patent [19]
Keller, Jr.

[11] Patent Number: 5,160,596
[45] Date of Patent: Nov. 3, 1992

[54] MEMBRANELESS CHLORINE GAS GENERATING APPARATUS

[76] Inventor: R. Davidson Keller, Jr., 1870 Oak Creek Dr., Dunedin, Fla. 34698

[21] Appl. No.: 741,631

[22] Filed: Aug. 7, 1991

Related U.S. Application Data

[63] Continuation-in-part of Ser. No. 662,922, Mar. 1, 1991, abandoned.

[51] Int. Cl.⁵ .............. C25B 9/00; C25B 11/10; C25B 11/12; C25B 15/08
[52] U.S. Cl. .................. 204/266; 204/278; 204/290 F; 204/294; 204/271
[58] Field of Search .............. 204/275–278, 204/263–266, 271, 294, 290 F

[56] References Cited

U.S. PATENT DOCUMENTS

| | | | |
|---|---|---|---|
| 1,255,096 | 1/1918 | Jaubert | |
| 3,129,162 | 4/1964 | Jones | 204/278 |
| 4,097,356 | 6/1978 | Yates | 204/237 |
| 4,248,715 | 2/1981 | Olivier | 204/260 |
| 4,256,551 | 3/1981 | Cliff et al. | 204/98 |
| 4,290,873 | 9/1981 | Weaver | 204/228 |
| 4,361,471 | 11/1982 | Kosarek | 204/128 |
| 4,363,713 | 12/1982 | Bindon | 204/278 |
| 4,419,207 | 12/1983 | Bidon | 204/237 |
| 4,472,256 | 9/1984 | Hilbig | 204/278 X |
| 4,493,760 | 1/1985 | Bianchi | 204/278 |
| 4,599,159 | 7/1986 | Hilbig | 204/266 |
| 4,698,144 | 10/1987 | Wainerdi | 204/257 |
| 4,761,208 | 8/1988 | Gram et al. | 204/95 |
| 4,770,753 | 9/1988 | Ramshaw | 204/212 |
| 4,899,774 | 2/1990 | Keller, Jr. | 137/4 |
| 4,976,842 | 12/1990 | Fowler | 204/271 X |
| 5,037,519 | 8/1991 | Wiscombe | 204/266 X |
| 5,053,114 | 10/1991 | Maddock | 204/266 X |

Primary Examiner—Donald R. Valentine
Attorney, Agent, or Firm—Herbert W. Larson

[57] ABSTRACT

This chlorine gas generating apparatus controls the operating level of a liquid anolyte, catholyte and liquid interface by a combination of overflow pipe routed to a caustic catchment basin and a float or electronic sensor designed to add water as caustic concentration increases to an unacceptable level. Salt is stored above the liquid level and is consumed upon demand by the system so that a constant volume of salt is maintained in the liquid portion of the cell. Chlorine gas is directed to a catchment basin where it is collected and then delivered to a pool or other area to be sanitized.

15 Claims, 6 Drawing Sheets

MEMBRANELESS CHLORINE GAS GENERATING APPARATUS

PRIOR APPLICATION

This application is a continuation-in-part application from my prior application Ser. No. 07/662,922, filed Mar. 1, 1991, now abandoned.

BACKGROUND OF THE INVENTION

1. Field of The Invention

This invention relates to chlor-alkali cells. More particularly, it refers to a cell for separating chlorine in gaseous form and sodium from salt without the presence of a membrane between the anolyte and catholyte.

2. Description of The Prior Art.

Although various membraneless gas generating apparatus are known such as the one for oxygen production shown in U.S. Pat. No. 1,255,096 and chlorine production shown in 4,256,551, these apparatus suffer from intermittent gas production. Additionally, in U.S. Pat. No. 4,256,551, close control must be maintained of the temperature of the brine in the system and there is no mechanism for automatically adding water and salt.

U.S. Pat. Nos. 4,363,713 and 4,419,207 describe a halogen generator submerged in water. A space between the anode and cathode is filled with salt. The salt bed and an upward water and brine flow maintains separation between the catholyte and anolyte. The generator must be periodically removed from the water to resupply the salt.

An apparatus is needed that will furnish a continuous supply of chlorine to a swimming pool as needed without constant manual attention.

SUMMARY OF THE INVENTION

I have invented an apparatus that will continuously supply a halogen gas such as chlorine to a swimming pool or other body of water without the need for constant attention by the operator.

My apparatus controls the operating level of a liquid anolyte, catholyte and their interface by a combination of overflow pipe routed to a caustic catchment basin and a hydrometer float, or an electronic sensor designed to activate a water source to permit the addition of water as the caustic concentration increases to an unacceptable level. The hydrometer float actuates and positions a plate redirecting a continuous flow of water to the catholyte reservoir. The electronic sensor activates a valve to allow water to flow to the catholyte reservoir. Salt is stored above the liquid level and is consumed upon demand by the system, thereby providing a constant volume of salt in the liquid portion of the system. Chlorine gas coming off at the anode is carried to a collecting chamber where it is drawn off for use.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
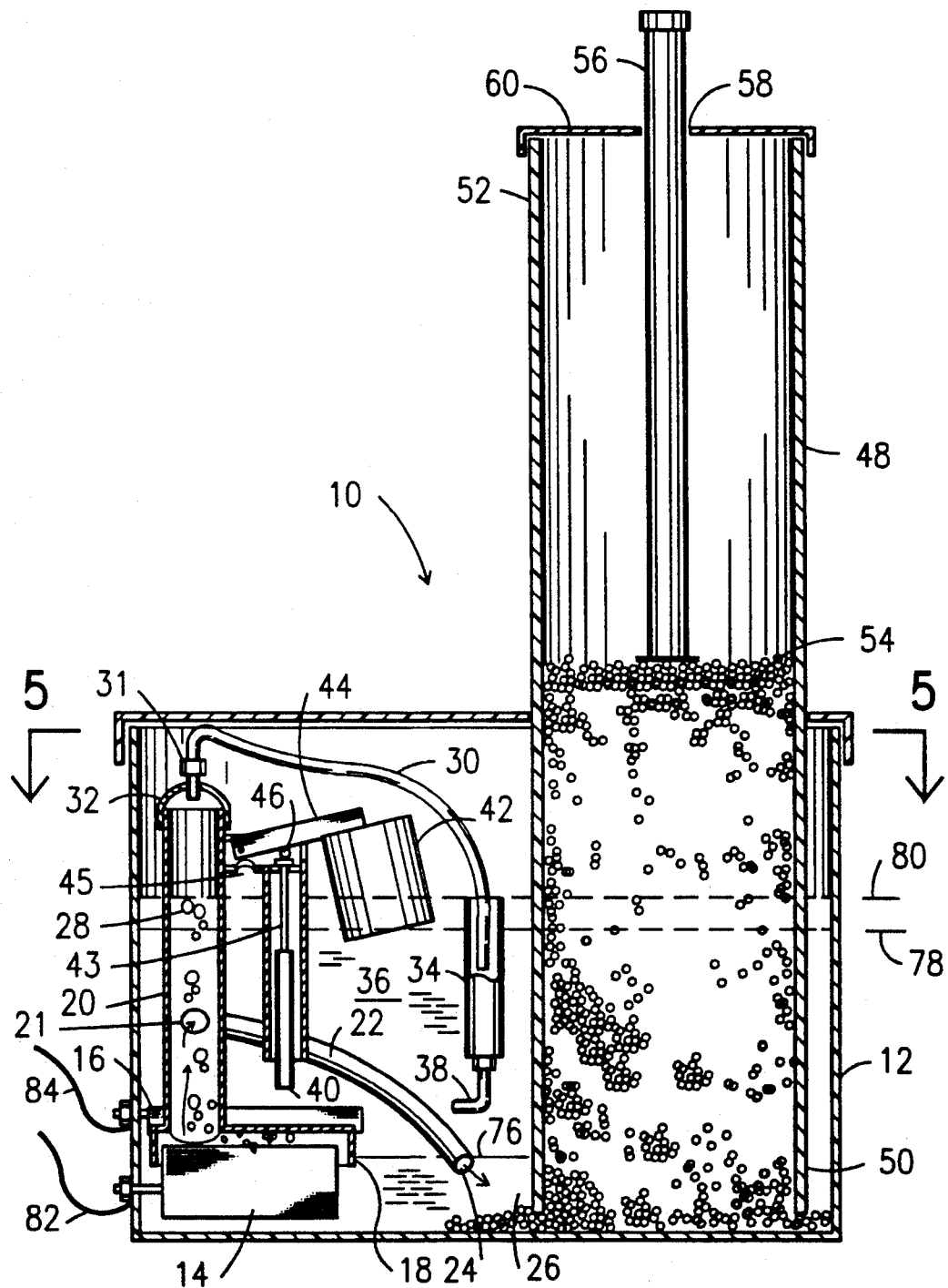
FIG. 1 is a side sectional view in elevation of the apparatus.

Throughout the following detailed description, the same reference numerals refer to the same elements in all figures.

My halogen gas generating apparatus 10 shown in FIG. 1 has a cell 12 containing an anode 14 and a cathode 16 in close vertical proximity to each other. A hood 18 is located above the anode 14. The hood 18 is integral with a vertically extending gas separator column 20. Cathode 16 is located above the lower lip of the hood. Column 20 also serves as a brine pump to return depleted brine to the salt bed or brine solution 26. A conduit 22 returns weak brine produced at the anode from a bore 21 in a lower portion of the gas separator column 20 to the brine solution 26. The description hereinafter refers to chlorine gas produced by this apparatus, but it is understood that other halogen gases ca be produced by changing the salt content.

Chlorine gas 28 bubbles up through the gas separator column 20 to a tube 30 having a gas tight connection 31 to the top 32 of gas separator column 20. Tube 30 leads to a catchment basin container 34 where the chlorine gas may mix with liquid caustic 36 overflowing into the catchment basin container 34 from the cell 12. The container has a tube 38 which leads to a liquid to be sanitized, such as a swimming pool. Alternatively, tube 38 can lead directly to a tank for storage or direct use of the chlorine gas 28.

A hydrometer body 40 is floatably disposed within the caustic 36 and moves in an upward direction as the density of the caustic 36 increases. This upward movement causes plate 41 supported by rod 43 to redirect a water stream from nozzle 46 and allow water to deflect through hole 45 into the caustic 36. A float 42 is attached to a plate 44. As the float 42 moves downward in response to decreased caustic level from 80 to 78, the plate 44 moves downwards and allows the water input 46 to be deflected into the caustic 36. Water flows continuously through tubes 67 and 68 when the hydrometer body 40 is in its down position and the plate 44 is in its up position.

Figure 6:
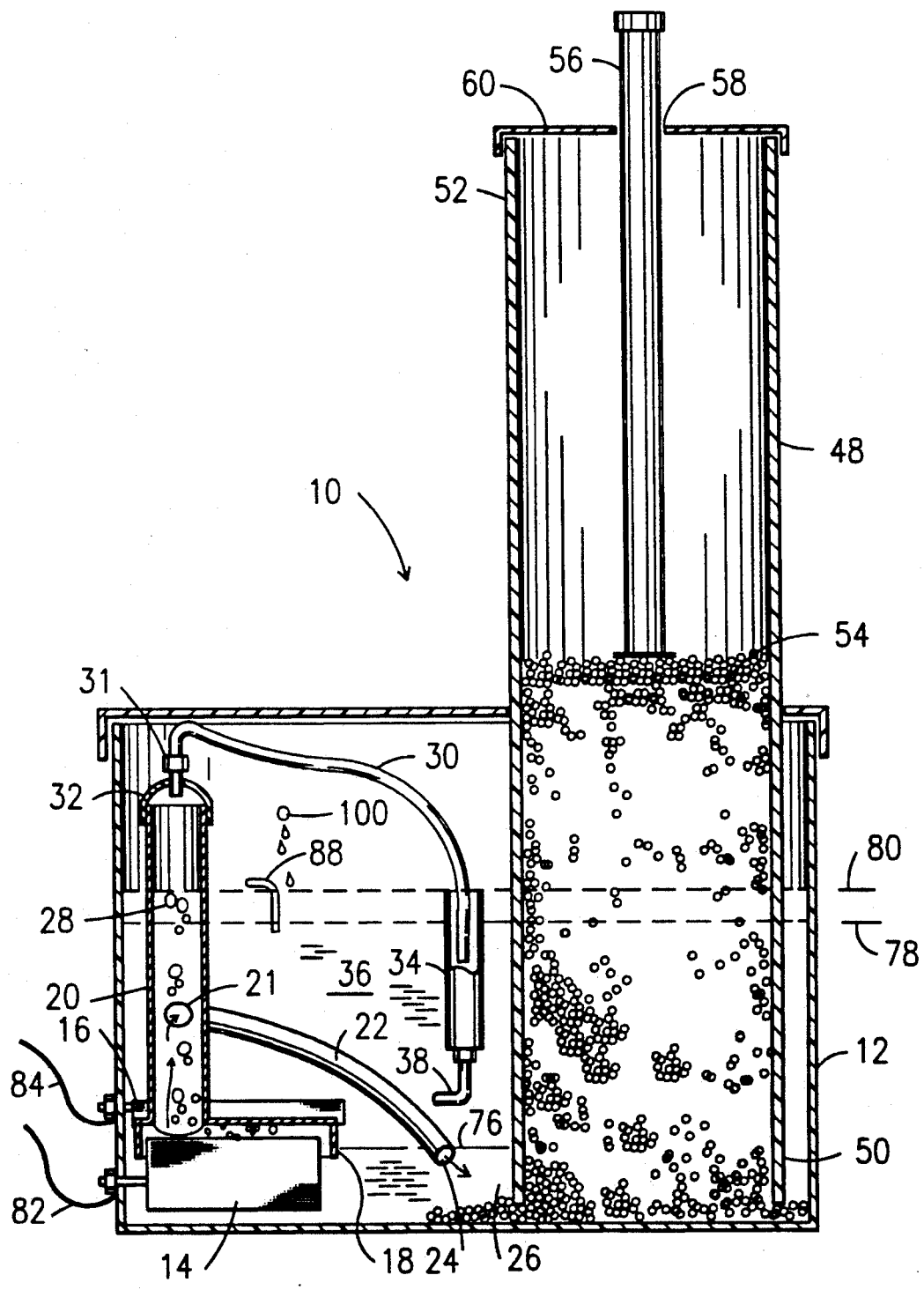
FIG. 6 is a side sectional elevational view of the apparatus with an electronic sensor to detect changes in caustic level.

In an alternative embodiment, an electronic control, senses cell resistance either through an electrode sensor 88 shown in FIG. 6, located in the wall of cell 12 or increased current through an ampmeter 90. A comparator circuit measures the cell resistance and activates a valve 128 to allow water to flow into the caustic 36 through pipe 100 when the caustic concentration increases to an unacceptable level.

Figure 7:
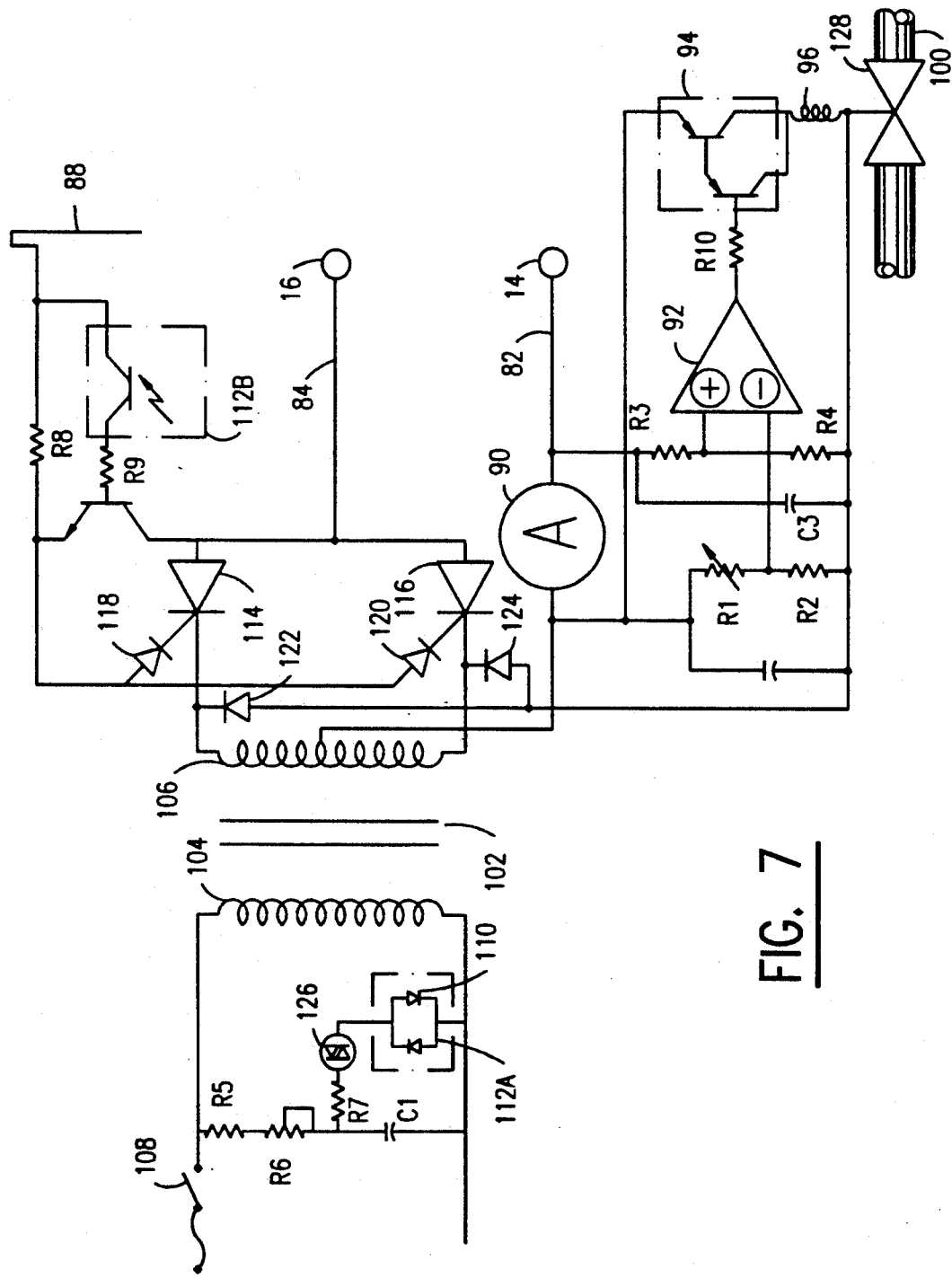
FIG. 7 is a schematic view of the electronic sensor system.

A circuit for the electronic sensor is set forth in FIG. 7. This preferred circuit is connected to the cathode 16 and anode 14 through wires 84 and 82 respectively, with an ampmeter 90 sustaining a voltage drop when the caustic concentration increases. A shielded probe 88 mounted in the cell wall 12 warns the circuit if the caustic solution drops below line 78 as shown in FIG. 6. This prevents the system from continuing to operate when danger of explosion is possible. Resistors R1, R2, R3 and R4 in the circuit shown in FIG. 7 are selected so non inverting operational amplifier input is high until caustic concentration increases causing voltage drop across ampmeter 90 to increase to the point that minus input becomes higher than plus input. The operational amplifier comparator 92 will then switch its output low, turning on the darlington transistor pair 94, allowing current to flow through solenoid valve coil 96 to operate valve 128 and allow water to flow through a pipe 100 into the caustic solution.

An iron core transformer 102 concentrates magnetic flux from the primary coil 104 for the secondary coil 106. A switch 108 activates the power supply and timing circuit R5, R6 and C1 which fires diac 126 activating a light emitting diode 110 in an optical isolator circuit 112A and B, triggering SCR 114 or 116. Isolation diodes 118 and 120 prevent the circuit from self-triggering. Diodes 122 and 124 act as power rectifiers to power comparator circuit 92 and its bias networks.

Other methods of density control could include a manual sampling of the caustic every few hours to determine density and making appropriate water input adjustments. A timer control could be used if water input and cell power were held constant.

Figure 2:
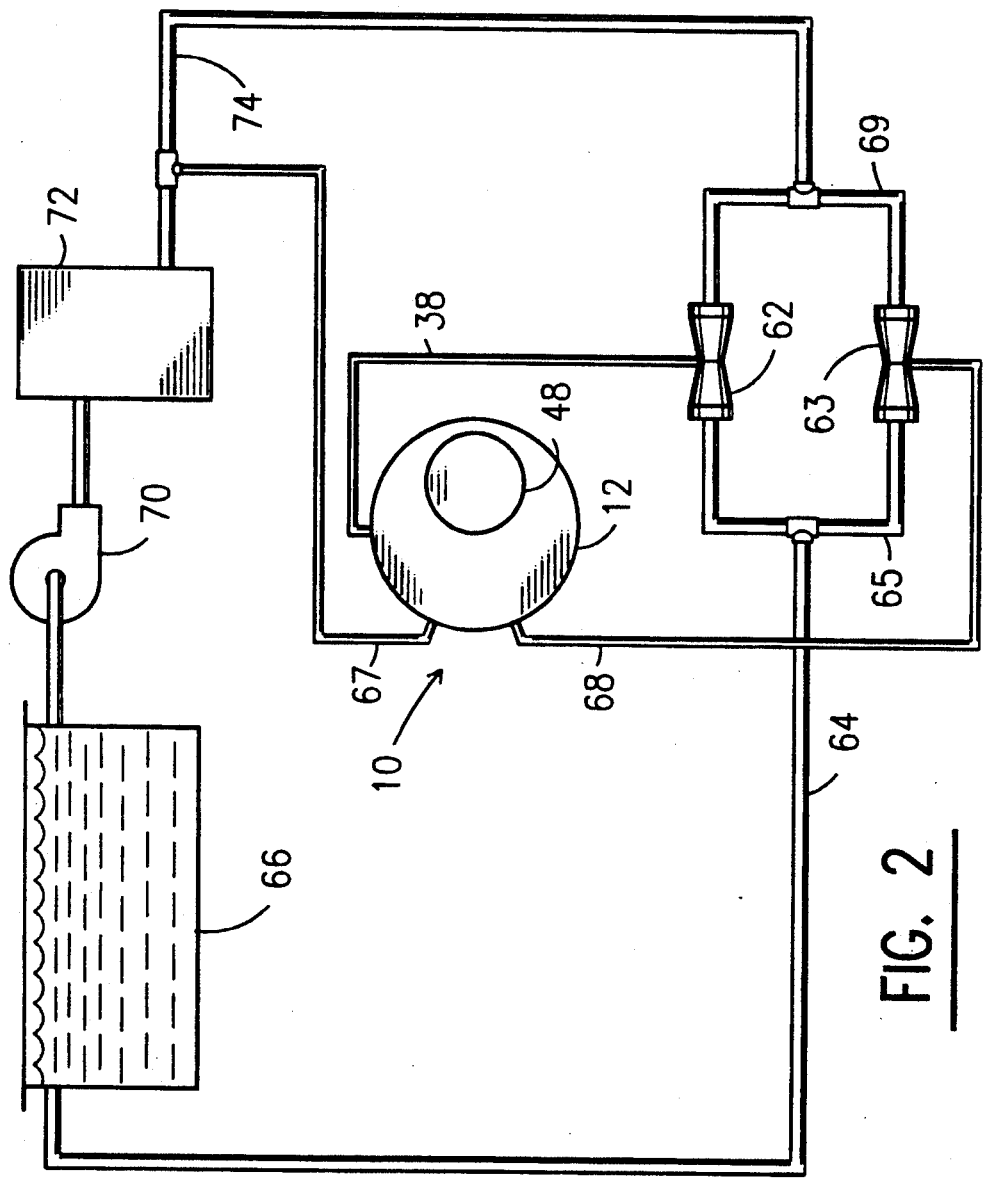
FIG. 2 is a schematic view of the method for continuously feeding chlorine to a pool.

A container 48 is vertically disposed in the cell 12 so that its first end 50 is located below the upper level 76 of the brine solution 26. The upper level of the brine solution is also the caustic brine interface 76. The second end 52 of the container 48 allows for insertion of solid granular salt 54 which is stored within the container 48 and is used gradually upon utilization of the brine. An indicator rod 56 protruding through a hole 58 in lid 60 of the container 48 provides a means for visually determining the amount of salt in the container 48. In the schematic shown in FIG. 2 a completely enclosed system is shown whereby the halogen solution moves through tube 38, through a venturi 62 from whence it is directed through additional tubes 64 to a swimming pool 66. The control stream collector line 68 permits the water to return directly to the system via venturi 63 when it is not deflected into the caustic 36. A pump 70 moves water from the swimming pool 66, passes it through a standard filter 72, and then to piping 67 back to the cell 12 or through a venturi and pipe 64 back to the pool as seen in FIG. 2. An alternate pipe 69 leads to another venturi 63 which directs the flow to pipe 65 back to pipe 64.

Figure 4:
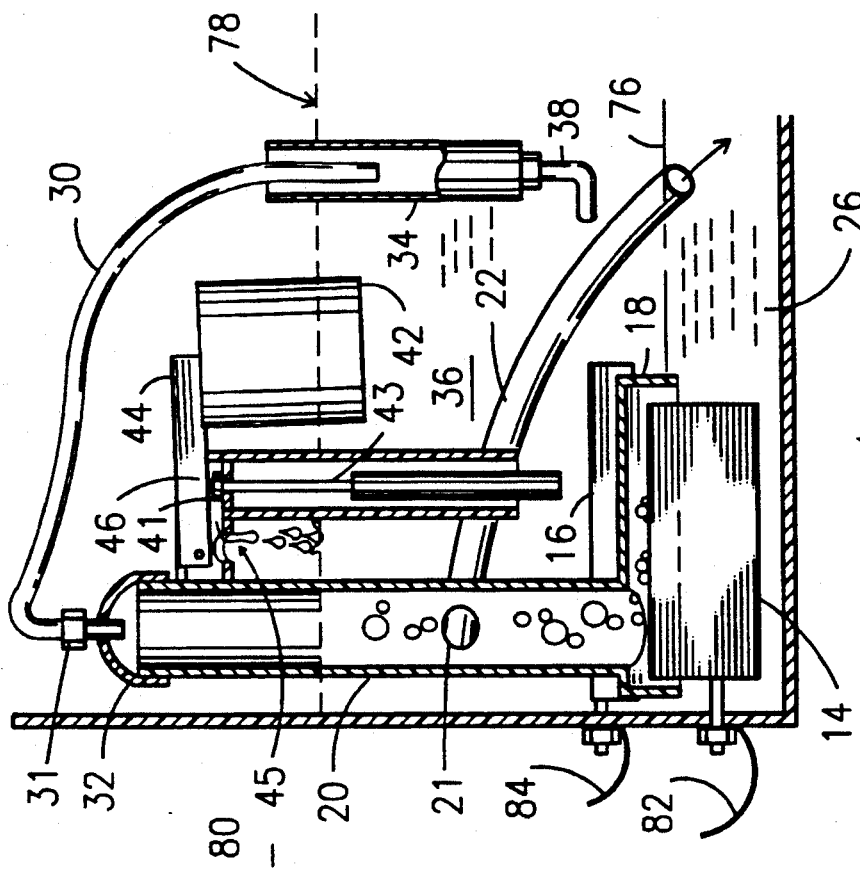
FIG. 4 is a side sectional view in elevation of a low level of catholyte with the level control float moving a plate deflecting water to the catholyte reservoir.
Figure 3:
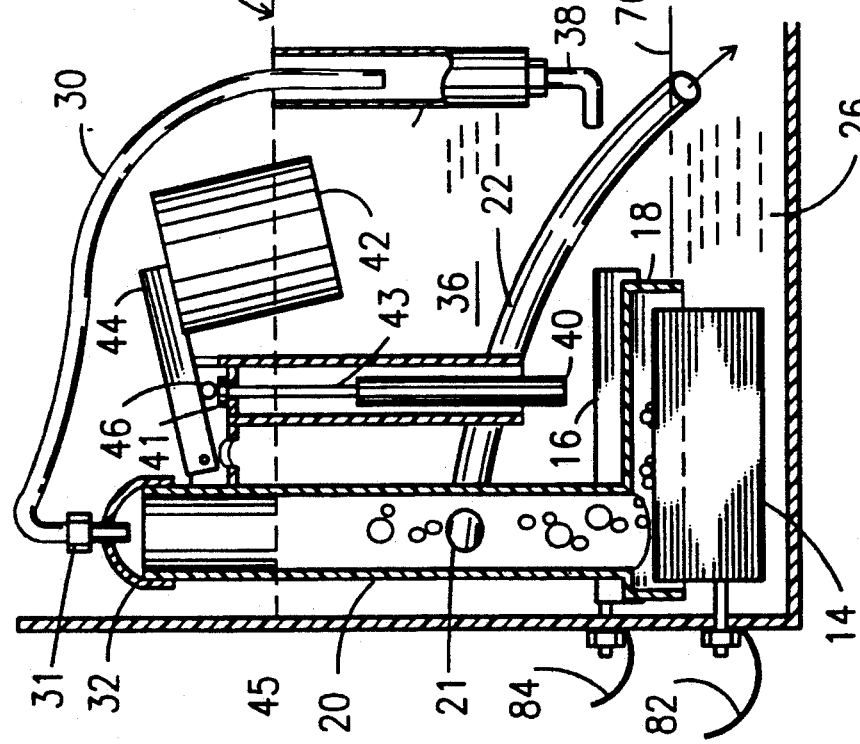
FIG. 3 is a side sectional view in elevation of standard operating level for the catholyte reservoir.
Figure 5:
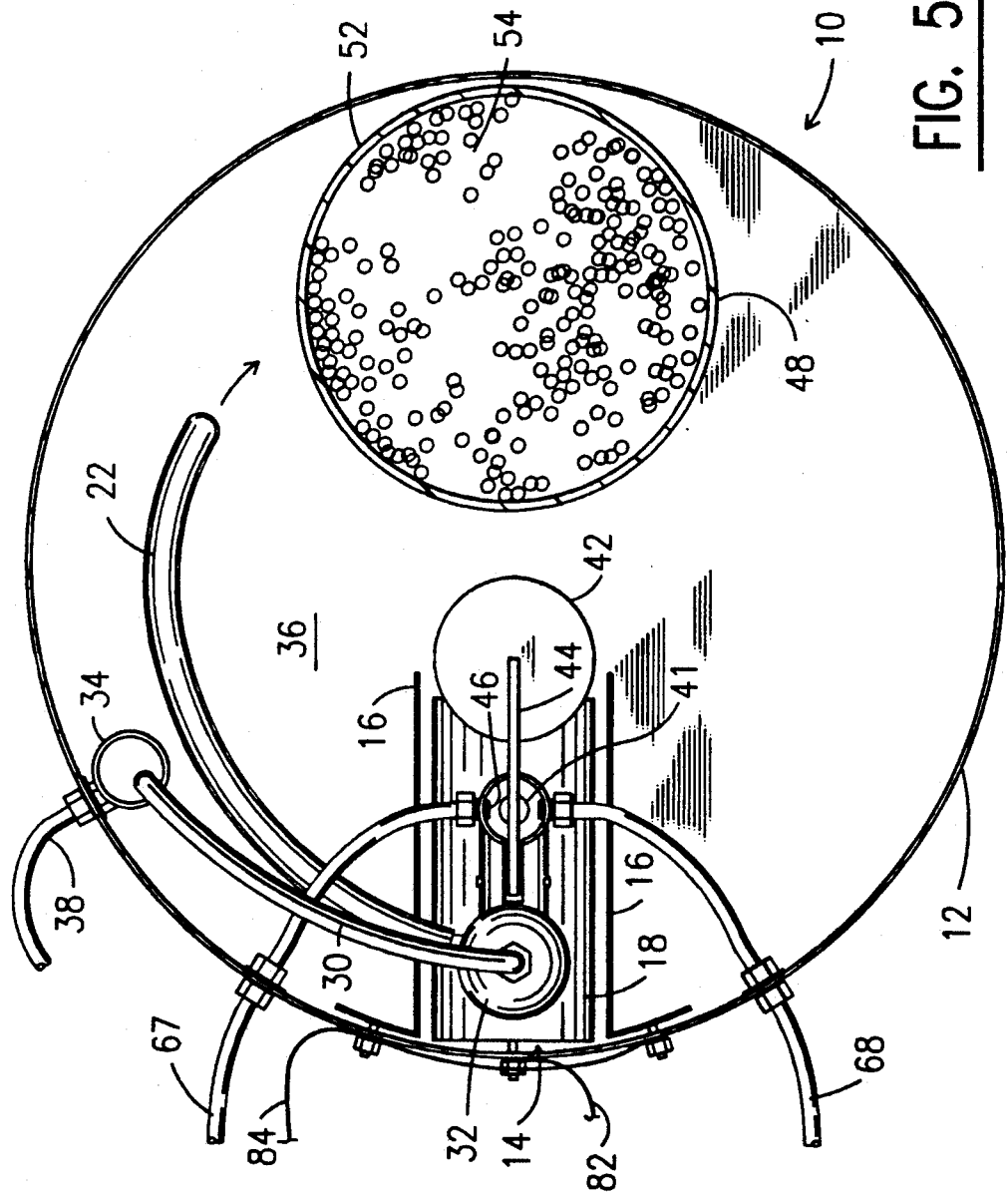
FIG. 5 is a top plan view along lines 5—5 of FIG. 1.

The hydrometer body 40 is seen in more detail in FIGS. 3 and 4. The hydrometer is similar to the one set forth in U. S. Pat. No. 4,899,774 and the teaching in that patent is herein incorporated by reference. The hydrometer body 40 floats in the caustic solution 36 as seen in FIGS. 3 and 4 in its normal position when there is a preferred caustic density of about 1.01. If the density of the caustic rises above 1.01 it will cause the hydrometer body 40 to rise and cause its circular head plate 41 to block the flow of water through opening 46, thereby causing the water to flow downwardly through opening 45 into the caustic 36 to lower its density.

If the level of the caustic 36 falls too low as seen in FIG. 4, then float 42 lowers to allow plate 44 to deflect the water flowing through nozzle 46 so that it will flow downwardly into the caustic 36 to raise its level to that seen in FIG. 3, whereupon the plate 44 is raised by float 42 and the water flows through the system out through conduit 68 without entering the cell caustic solution.

The apparatus described above provides a chlorine gas producing chlor-alkali cell with a current efficiency which approaches the theoretical current requirements of 200 ampere-hour per pound of chlorine gas produced. Electrical current is provided to the system through wires 82 and 84. The cell requires no control instrumentation or valves involving routine maintenance adjustment or skill to set up or care for. Furthermore, the system is not sensitive to salt purity or contamination, thus making it a practical water purification device in areas where pure salt is not available.

The salt compartment 48 and caustic cell compartment 12 can be of any desired cross section or configuration. The salt 54 flows freely into the caustic chamber lower brine region 26 where it is dissolved and electrically decomposed at the anode 14.

The chlorine gas 28 produced at the anode 14 rises as it bubbles in the gas catcher 18 or separator column 20. The depleted brine is separated and returned to the brine region 26 via conduit 22. The salt 54 moves into the brine region 26 by gravity flow from chamber 48.

The anolyte (brine)-catholyte interface 76 is well defined in this system and appears at its highest level below the bottom of cathode 16. The catholyte 36 is maintained above the denser brine under normal steady-state operation.

The cathode 16 is positioned above the anode plate 14 at a distance of about 0 to 5 cm and preferably about 1 to 2 cm. The cathode is made preferably from stainless steel or titanium. The anode is made preferably from carbon, graphite, or platinum, or iridium coated titanium.

The maximum level 80 of caustic is controlled by the upper lip of collector chamber 34. The minimum caustic level 78 is controlled by float 42. Mixing of water introduced into the caustic is caused by the stirring action of the hydrogen gas by bubbles formed at the cathode 16.

Conduit 30 may be directed to a receiving body for the chlorine gas or to the collecting chamber 34 as seen in FIG. 1 so that catholyte, water and gas are mixed and conducted to the point of use. For such a configuration to be effective, a slight vacuum placed at the destination end of conduit 30 will serve to prevent loss of chlorine.

Equivalent equipment can be used to modify the apparatus and method described above without departing from the invention.

Having thus described the invention, what is claimed and desired to be secured by Letters Patent is:

1. An apparatus for electrolytically generating a halogen gas from a brine solution located in a cell comprising an anode located below a top surface of a hood, the hood adapted to define a portion of a boundary between a caustic and brine solution interface, a cathode adapted to be located in close vertical proximity above the caustic and brine solution interface, the hood for collecting halogen gas positioned over the anode, the hood leading upwardly to a halogen gas separator column, a salt storage compartment open at a first and second end, the first lower end adapted to open above the brine solution in the cell, the second upper end being open to allow filling of the compartment with salt, a gas tight tue leading from a top portion of the gas separator column to a receiving body for the gas, and a means for sensing when the density of the caustic solution exceeds a predetermined density figure.

2. The apparatus according to claim 1 wherein a tube leads from a lower portion of the halogen gas separator column downwardly to return weak brine generated at the anode to the brine solution.

3. The apparatus according to claim 1 wherein the means for sensing the caustic solution is an electronic sensor.

4. The apparatus according to claim 5 wherein the vertical distance between the anode and cathode is about one to two centimeters.

5. An apparatus for electrolytically generating a halogen gas from a brine solution located in a cell comprising an anode adapted to be located below a caustic solution and brine solution interface, a cathode adapted to be located in close vertical proximity above both the anode and the caustic solution and brine solution interface, a halogen gas collection hood positioned over the anode, the hood leading upwardly to a halogen gas separator column, a salt storage compartment open at a first and second end, the first lower end adapted to open above the brine solution in the cell, the second upper end being open to allow filling of the compartment with granular salt, a tube leading from a lower portion of the gas separator column downwardly to return weak brine generated at the anode to the brine solution, a gas tight tube leading from a top portion of the gas separator column to a receiving body for the gas, and a means for sensing when the density of the caustic solution liquid exceeds a predetermined density figure.

6. The apparatus according to claim 5 wherein the means for sensing the caustic solution is a hydrometer adapted to be floatably disposed within the caustic solution with water deflecting means attached to the hydrometer to deflect a stream of water into the caustic solution when the density of the caustic exceeds a predetermined density figure.

7. The apparatus according to claim 6 wherein a float is adapted to be disposed within the caustic solution contained within the cell, the float being attached to a pivoting plate adapted to cover a continuous stream of water to deflect the water into the caustic solution to raise the level of caustic solution within the cell when the caustic level recedes.

8. The apparatus according to claim 5 wherein the gas tight tube leads to a collecting tank where the halogen gas is capable of being mixed with the caustic solution overflow from the cell and a conduit is connected at a first end to a bottom of the collecting tank and at a second end to a recipient body of liquids, circulation in the collecting tank being induced by a vacuum.

9. An apparatus for electrolytically generating chlorine gas from a brine solution located in a cell comprising an anode adapted to be located below a caustic solution and brine solution interface, a cathode adapted to be located in close vertical proximity above both the anode and the caustic solution brine interface, a chlorine gas collection hood positioned over the anode, the hood integral with a vertically mounted chlorine gas separating column, the cathode positioned in close vertical proximity above a lower lip of the hood, a vertically positioned slat storage compartment open at a first and second end, the first lower end adapted to open to the brine solution at the bottom of the cell, the second upper end located above the cell to provide an opening for adding granular sodium chloride, a conduit leading downwardly from a hole in a wall of the separating column and a lower portion adapted to be in a position below the caustic solution and brine solution interface to return a weak depleted brine solution generated at the anode to the brine solution, a gas tight tube leading from a top portion of the column to a receiving body for the chlorine gas, and a means for sensing when the density of the caustic solution exceeds a predetermined density.

10. The apparatus according to claim 9, wherein the means for sensing when the density of the caustic solution exceeds a predetermined density is a hydrometer adapted to be floatably disposed within the caustic solution with water deflecting means attached to the hydrometer adapted to deflect a stream of water into the caustic solution when the density of the caustic solution exceeds a predetermined density.

11. The apparatus according to claim 10 wherein a float is adapted to be disposed within the caustic solution contained within the cell, the float attached to a pivotable plate adapted to deflect a stream of water into the caustic solution when the caustic solution level within the cell recedes to a predetermined level.

12. The apparatus according to claim 9 wherein the means for sensing when the density of the caustic solution exceeds a predetermined density is an electronic sensor.

13. The apparatus according to claim 9 wherein the vertical distance between the anode and cathode is about one to two centimeters.

14. The apparatus according to claim 9 wherein the anode is composed of platinum coated titanium.

15. The apparatus according to claim 9 wherein the anode is composed of carbon graphite.

* * * * *